US008733713B1

(12) United States Patent
Leysock et al.

(10) Patent No.: US 8,733,713 B1
(45) Date of Patent: May 27, 2014

(54) AUTO-FOLDING TRAY SUPPORT

(75) Inventors: Gregory Leysock, Stow, OH (US);
Frederick Bosnakovic, Uniontown, OH (US)

(73) Assignee: Tablecraft Products Company, Gurnee, IL (US)

( * ) Notice: Subject to any disclaimer, the term of this patent is extended or adjusted under 35 U.S.C. 154(b) by 0 days.

(21) Appl. No.: 13/555,302

(22) Filed: Jul. 23, 2012

Related U.S. Application Data

(60) Provisional application No. 61/574,339, filed on Aug. 1, 2011.

(51) Int. Cl.
*F16M 11/38* (2006.01)

(52) U.S. Cl.
USPC .......................... 248/169; 248/171; 248/188.7

(58) Field of Classification Search
USPC ........... 248/168, 169, 170, 171, 188.6, 188.7, 248/528
See application file for complete search history.

(56) References Cited

U.S. PATENT DOCUMENTS

| | | | | |
|---|---|---|---|---|
| 4,183,579 A | * | 1/1980 | Gonzalez y. Rojas | ... 297/195.11 |
| 4,223,860 A | * | 9/1980 | Prest | .............................. 248/171 |
| 5,137,236 A | * | 8/1992 | Burns | ........................... 248/171 |
| 5,934,628 A | * | 8/1999 | Bosnakovic | ............... 248/177.1 |
| 6,454,228 B1 | * | 9/2002 | Bosnakovic | ............... 248/177.1 |
| 7,802,764 B2 | * | 9/2010 | Leinen | .......................... 248/129 |

* cited by examiner

*Primary Examiner* — Gwendolyn Baxter
(74) *Attorney, Agent, or Firm* — Pearne & Gordon LLP

(57) ABSTRACT

An auto-folding tray support having a central column, a lower portion of the column being slidable in a central lower member, at least three support legs each pivotally connected at a respective mid-section to the central column above the lower member, a rigid link associated with each leg, each link being pivotally connected adjacent opposite ends of the link to the lower member and to a lower part of a respective leg, pivot connections of the links being arranged such that said lower parts of the legs are automatically spread from the central column when the central column is lowered into the lower member and are automatically drawn towards the central column when the central column is lifted relative to the lower member.

1 Claim, 4 Drawing Sheets

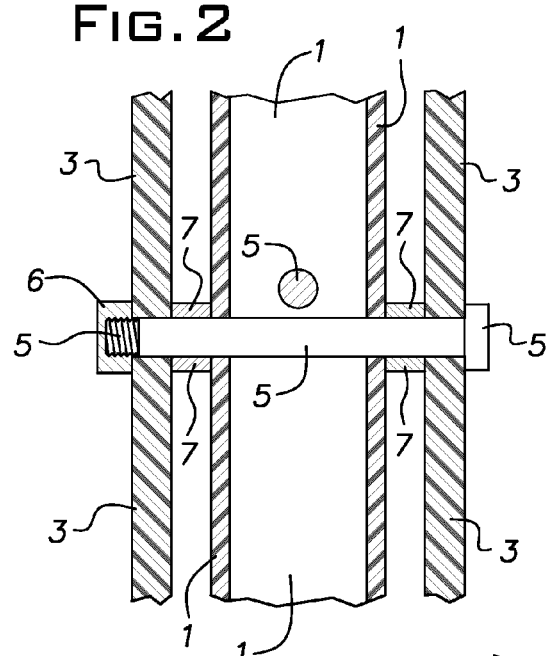
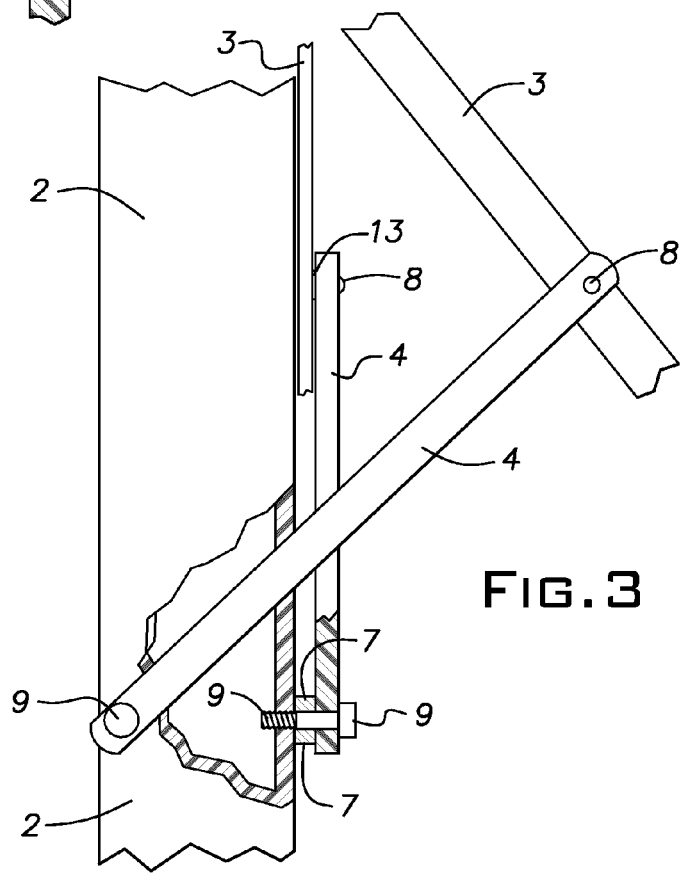

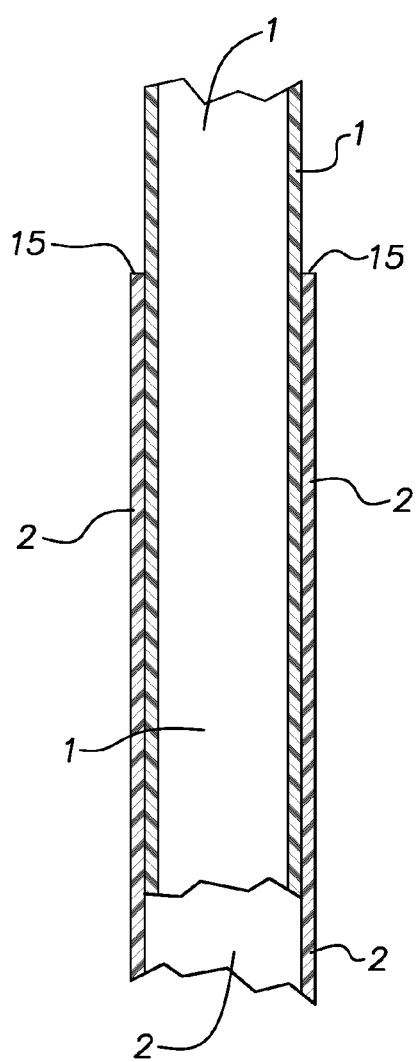
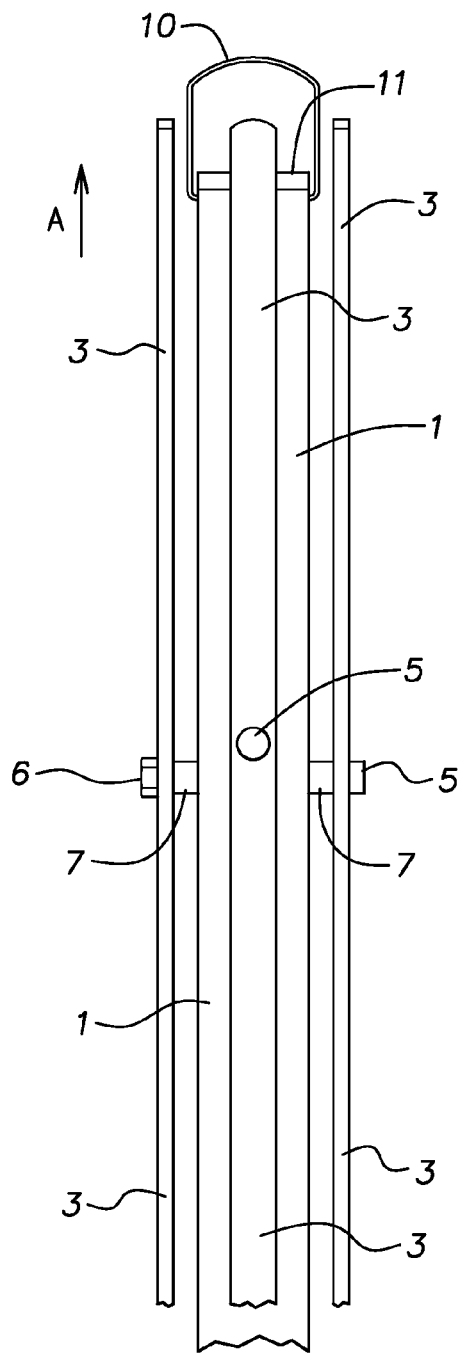

AUTO-FOLDING TRAY SUPPORT

Generally, the present invention relates to an auto-folding tray support. Particularly the invention relates to a quadripod although the number of legs is not intended to be limiting. The invention includes support legs which open automatically and close automatically when the apparatus is placed on a support surface and lifted from the support surface, respectively. Furthermore, the legs have a length such that the upper legs, opposite the support surface, pivot on a center column in an opposite direction from the lower legs and form a "footprint" at the top of the apparatus. The footprint is suitable for holding an object such as a table or serving tray in the horizontal position.

The invention includes a center column comprised of telescopic tubing with an upper section which slides downward or upward within a lower section.

The invention is also comprised of legs and coupling links. The legs are attached pivotally at a point on the supper center column and movable between open and closed positions. One end of a coupling link is connected to the lower end of the center column and the opposite end of the coupling link is connected to the lower leg.

The invention operates to open when the lower center column is lowered onto a surface. The upper center column travels downward through the lower center column and having the coupling links pushing the lower legs outward. The invention closes upon lifting the upper center column by an attached ring or handle. The lower legs come to full stop when retracting by coming in contract with spacers attached to the bottom center column. The links may also be bent or formed to eliminate the lower spacers.

The present invention is constructed of aluminum alloy. Other materials could be substituted but strength and weight requirements must be considered. The present invention is assembled using fasteners at the pivot points such as nuts, bolts, rivets or screws. Spacers can be used to maintain parallel spacing between the legs, coupling links and center column sections.

Further descriptions of the invention will be evident in the drawings.

BRIEF DESCRIPTION OF THE DRAWINGS

Preferred embodiments of the invention are set forth in the following description and are shown in the drawings.

FIG. 2 is an enlarged fragmentary sectional view showing the upper center column and leg attachments;

FIG. 3 is an enlarged fragmentary sectional view showing the lower center column and coupling links attached to a leg and the lower center column;

FIG. 4 is a side cross sectional view of the upper center column telescopically engaged into the lower center column;

FIG. 5 is a side elevational view of the upper center column in the lifted position with the upper legs in the closed or retracted position;

DESCRIPTION OF THE PREFERRED EMBODIMENTS

Figure 1:
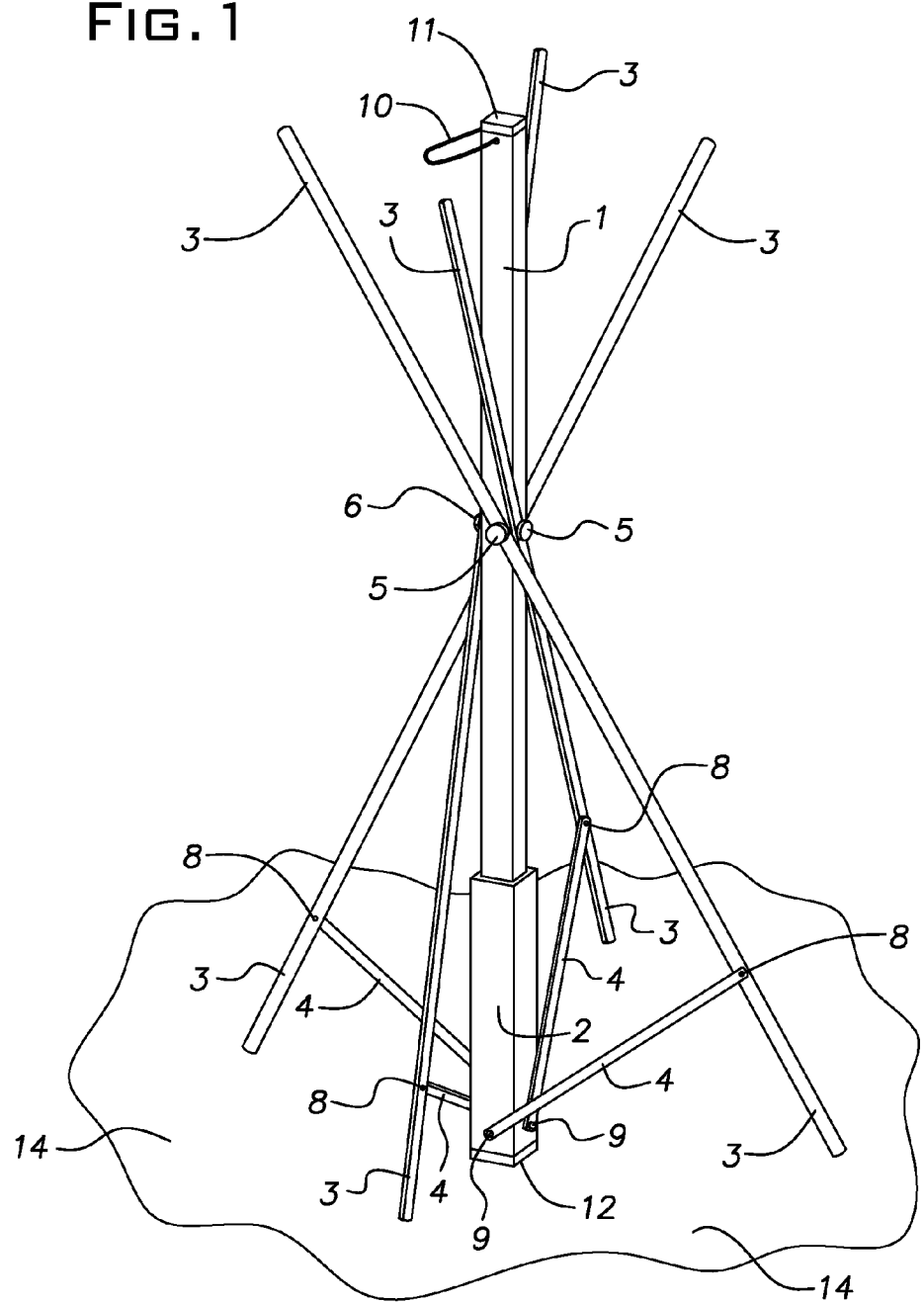
FIG. 1 is a perspective view of the quadripod of the present invention on a support surface. The upper and lower legs are shown in the open or extended position.

The present invention is a quadripod and is generally indicated in FIG. 1 consisting of four sides. The present invention includes an upper center column 1, four support legs 3, pivotally attached to upper center column 1 and four coupling links 4. One end of a coupling link 4 is pivotally attached to each of a support leg 3 and the opposite end is pivotally attached to lower center column 2.

Upper center column 1 and lower center column 2 are tubular housings. Upper center column 1 telescopically engages lower center column 2 at a top end 15 as shown in FIG. 4. The tubular housing 1 and 2 are manufactured as telescopic tubing such that upper center column 1 slides freely within lower center column 2.

As shown in FIG. 2 the upper legs 3 are pivotally attached to center column 1 by threaded bolts 5 inserted through holes in legs 3. Threaded bolts 5 extend through legs 3, spacers 7, and center column 1. Bolts 5 extend through column 1, spacers 7 and legs 3 on the opposite side of the entrance point and the assembly is secured by threaded nut 6.

It is also shown in FIG. 2 that bolts 5 are offset through column 1. This results in that legs 3 assembled on the upper bolt 5 needing to be trimmed opposite the support surface 14 by the centerline distance between bolts 5. This operation maintains an equal distance between support surface 14 and the tops of legs 3 when in the open position.

As shown in FIG. 3, lower support legs 3 are pivotally attached to one end of coupling links 4 by means of rivets 8 through holes in legs 3 and links 4. The opposite end of coupling links 4 are pivotally attached to lower center column 2 by shoulder bolt 9. FIG. 3 shows bolt 9 inserted through a hole in link 4 and spacer 7 and engaging a threaded hole in column 2.

FIG. 5 shows the upper portion of the invention in the lifted position in direction A. This is done by grasping lifting ring 10 which can be attached to upper center column 1 or any of the upper legs 3. Column 1 has a finishing cap 11 of a plastic material. Legs 3 are shown in the closed or retracted position along the center line of column 1.

Figure 6:
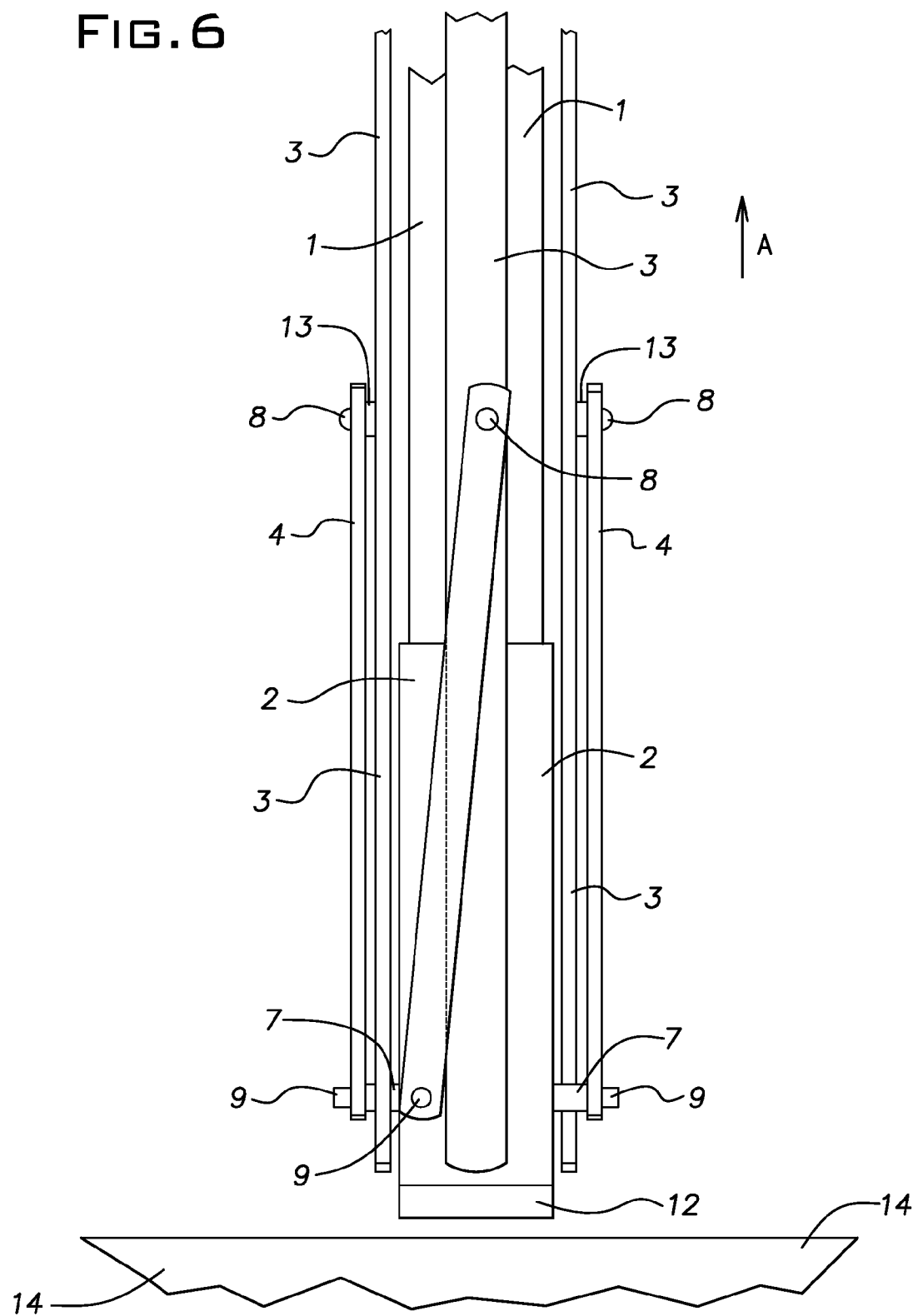
FIG. 6 is a side elevational view of the lower center column in the lifted position and with the lower legs and coupling links in the closed or retracted position.

FIG. 6 shows the bottom portion of the invention in the lifted position in direction A from support surface 14. Upper center column 1 slides upward within lower center column 2. The upward motion causes legs 3 and links 4 to pivot upon bolts 5, rivets 8, washers 13 and shoulder bolts 9. The pivoting action is a result of gravity and causes legs 3 and coupling links 4 to retract toward center columns 1 and 2. A plastic finishing cap is shown on the bottom of column 2.

It would be obvious to those skilled n the art that the materials of construction and dimensions of the above invention may be varied within the scope of the invention.

DRAWING REFERENCE NUMBERS

1. Upper center column
2. Lower center column
3. Support leg
4. Coupling link
5. Bolt
6. Nut
7. Spacer
8. Rivet
9. Shoulder bolt
10. Lifting ring
11. Upper end cap
12. Lower end cap
13. Washer
14. Support surface
15. Top end

What is claimed is:

1. An auto-folding tray support having a central column, a lower portion of the column being slidable in a central lower member, at least three support legs each having a mid-section pivotally connected to the central column above the lower member, a rigid link associated with each leg, each link being pivotally connected adjacent opposite ends of the link to the lower member and to a lower part of a respective leg, pivot connections of the links being arranged such that said lower parts of the legs are automatically spread from the central column when the central column is lowered into the lower member and are automatically drawn towards the central column when the central column is lifted relative to the lower member.

* * * * *